United States Patent
Shi et al.

(10) Patent No.: US 9,152,198 B2
(45) Date of Patent: Oct. 6, 2015

(54) POWER ADAPTER AND ELECTRICAL CONNECTOR THEREFOR

(75) Inventors: Changhao Shi, Suzhou (CN); Yu Wen, Suzhou (CN); Jianxin Zhang, Shanghai (CN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 540 days.

(21) Appl. No.: 13/607,735

(22) Filed: Sep. 9, 2012

(65) Prior Publication Data

US 2013/0286694 A1    Oct. 31, 2013

(30) Foreign Application Priority Data

Apr. 26, 2012    (CN) .................. 2012 1 0244251

(51) Int. Cl.
*H01R 9/05*    (2006.01)
*G06F 1/26*    (2006.01)
*H02J 9/00*    (2006.01)

(52) U.S. Cl.
CPC . *G06F 1/263* (2013.01); *H01R 9/05* (2013.01); *H02J 2009/007* (2013.01)

(58) Field of Classification Search
CPC .......... G06F 1/263; H01R 9/05; H01R 33/72; H02J 2009/007; H02M 1/36
USPC ............ 439/578, 579, 580, 698, 675; 363/49, 363/13
See application file for complete search history.

(56) References Cited

U.S. PATENT DOCUMENTS

| | | |
|---|---|---|
| 4,382,221 A | 5/1983 | Reynolds |
| 5,097,249 A | 3/1992 | Yamamoto |
| 5,568,370 A | 10/1996 | Goldstein |
| 5,602,455 A | 2/1997 | Stephens |
| 5,703,324 A * | 12/1997 | Harder .................. 174/21 C |
| 5,831,415 A | 11/1998 | Rudolph |
| 5,847,534 A | 12/1998 | Tanamachi |
| 5,847,543 A | 12/1998 | Carroll |
| 6,374,939 B1 | 4/2002 | Hohnstadt |
| 6,376,939 B1 | 4/2002 | Suzuki |
| 6,683,439 B2 | 1/2004 | Takano |
| 6,696,647 B2 | 2/2004 | Ono |
| 7,151,356 B1 | 12/2006 | Chen |
| 7,462,073 B2 | 12/2008 | Bell |
| 7,579,711 B2 | 8/2009 | Menas |
| 7,632,147 B2 | 12/2009 | Farahani |
| 8,094,673 B2 | 1/2012 | Proctor |
| 2005/0168189 A1 | 8/2005 | Schweigert |
| 2005/0194935 A1 | 9/2005 | Kubota |
| 2011/0095728 A1 | 4/2011 | Chen |

FOREIGN PATENT DOCUMENTS

| | | |
|---|---|---|
| JP | 05095414 | 4/1993 |
| WO | 2008019270 | 2/2008 |

\* cited by examiner

*Primary Examiner* — Javaid Nasri
(74) *Attorney, Agent, or Firm* — Charles Bergere

(57) ABSTRACT

A power adapter and an electrical connector for the power adapter operate to provide power to an electronic device such as a laptop computer. The power adapter includes a switch and a circuit for detecting whether or not the electrical connector is connected to the electronic device. If the adapter is not connected to an electronic device, the switch is opened so that no power is drawn from an AC supply. The electrical connector includes first and second conductors that are electrically connected to the detection circuit. The detection circuit detects a change in potential when the connector is plugged into an electronic device.

2 Claims, 4 Drawing Sheets

POWER ADAPTER AND ELECTRICAL CONNECTOR THEREFOR

CROSS-REFERENCE TO RELATED APPLICATIONS

The application is related to co-pending, co-owned U.S. patent application Ser. No. 12/592,289 filed on Nov. 30, 2009 assigned to Freescale Semiconductor, Inc.

BACKGROUND OF THE INVENTION

The present invention relates to electrical connectors and power adapters, and, more particularly, to an electrical connector suitable for connecting an electronic device, such as a laptop computer, by way of a power adapter to an AC supply.

Many electronic devices operate with direct current (DC). However, most electrical transmission and/or distribution systems provide alternating current (AC). Accordingly, many electronic devices have an AC-to-DC power adapter, variously referred to as an AC adapter, wall adapter or charger, to convert AC power from an AC supply (e.g., the main electrical supply) to DC power that may be used to operate and/or charge the electronic device. Many power adapters consume standby power, that is, they consume power even though the electronic device may be disconnected, fully charged or turned off. Users routinely leave power adapters plugged in or otherwise connected to the AC supply. As a result, the widespread use of power adapters consumes a significant amount of standby power, which, in turn, provides little or no utility and effectively wastes electrical energy.

One known way of addressing this problem of power wastage is described in Applicant's co-pending U.S. patent application published under number US2011/0121656. US2011/0121656 discloses an AC-to-DC power adapter having circuitry that enables the adapter to operate in a power saving mode under certain conditions. A switch is provided for isolating the power conversion circuitry from the AC power supply, and a processor for controlling the switch. In one mode of operation, the processor operates to close the switch when the adapter is plugged into the electronic device requiring the DC power and to open the switch when the adapter is unplugged from the electronic device. In the latter case, the adapter consequently operates in a power-saving mode because even though the adapter remains connected to the AC supply, it is not drawing any current from the AC supply.

However, some type of sensing arrangement needs to be provided in order to notify the processor of the status of the connection between the adapter and the electronic device, that is, whether the adapter is plugged into (i.e., electrically connected to) the power receiving socket of the electronic device or not.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DESCRIPTION OF PREFERRED EMBODIMENTS

Figure 1:
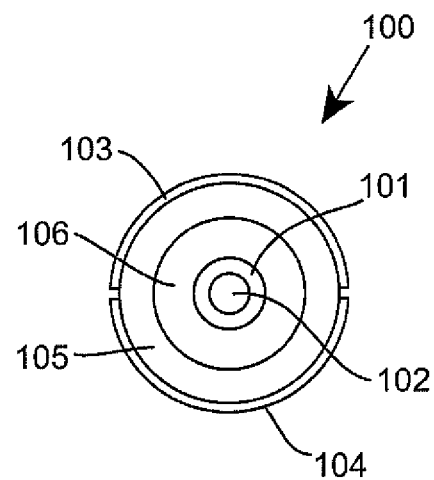
FIG. 1 is an end view of an electrical connector in accordance with one embodiment of the invention.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

In accordance with one aspect of the invention, an electrical connector assembly comprising a coaxial plug having an inner conducting contact and an outer conducting arrangement. The outer conducting arrangement includes two conducting parts that are electrically isolated from one another and supported on an insulating former.

The two conducting parts can assume a variety of configurations. In one example, each of the two conducting parts is shell-shaped. In another example, they each have the shape of a semi-cylindrical shell and are arranged on the insulating former diametrically opposite one another. Alternatively, the two conducting parts may each have the shape of a semi-cylindrical shell and be arranged coaxially on the insulating former. In a further alternative configuration, the two conducting parts may be ring-shaped and arranged coaxially around the insulating former.

In accordance with a second aspect of the invention, an electrical connector assembly including a plug and socket arrangement is provided. The plug includes at least first and second conducting parts that are electrically isolated from one another. The socket is provided with at least one electrically conducting element. The first and second conducting parts and the at least one conducting element are arranged so that when the plug is inserted into the socket, the at least one conducting element electrically links the first and second conducting parts.

In one example of a plug and socket arrangement, the plug is a coaxial plug comprising an inner conductor and an outer conductor. The outer conductor comprises two parts, each in the shape of a semi-cylindrical shell, arranged to be diametrically opposite one another and separated by a gap. The socket may be of conventional design such as is commonly fitted to lap-top computers and other portable electronic devices. This type of socket is usually provided with a metal spring arrangement for retaining the plug in addition to electrical contacts that make electrical connection with cooperating parts of the plug. When the plug is inserted into the socket, the metal spring arrangement makes contact with both parts of the plug's outer conductor, thereby electrically linking them together.

Hence, one example of the utility of the electrical connector assembly of the present invention serves to connect an AC-to-DC adapter of the type described above (which includes a processor for enabling a power-saving mode of operation) to an electronic device. With the DC output voltage output wired between the inner conductor and the first part of the outer conductor of the plug, the second part of the outer conductor of the plug is used to provide a signal to the processor indicating the status of the connection between the plug and the socket of the electronic device requiring DC power.

In accordance with a third aspect of the present invention, there is provided an AC-DC power adapter in combination with an electrical connector assembly consisting of a power outlet plug. The AC-to-DC power adapter is provided with a processing system for enabling and disabling a power saving mode of operation. The power outlet plug comprises a first conductor and a second conductor. The second conductor is composed of first and second parts that are electrically isolated from one another. The first conductor and the first part of the second conductor are connected across the DC output of the adapter. The second part of the second conductor is connected to an input of the processing system. The second part of the second conductor performs the function of a sensing arrangement for notifying the processing system of the status of the connection between the outlet plug and a socket of the device which requires DC power.

Figure 2:
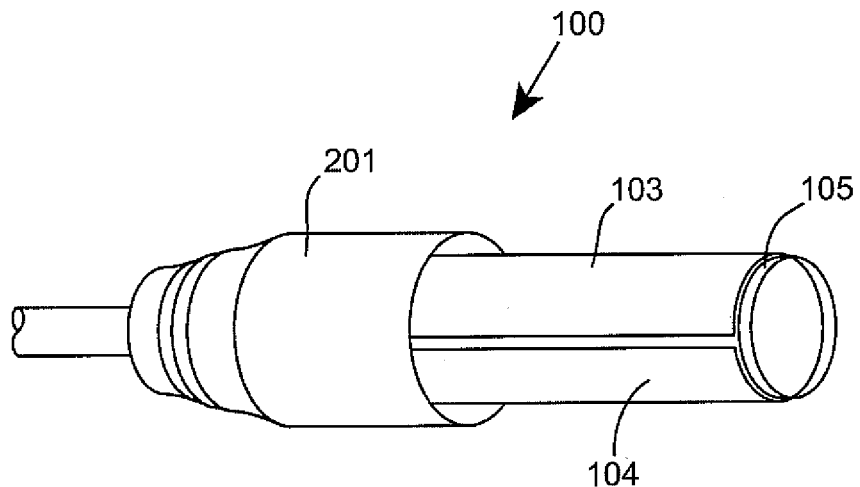
FIG. 2 is a perspective view of the electrical connector of FIG. 1.
Figure 3:
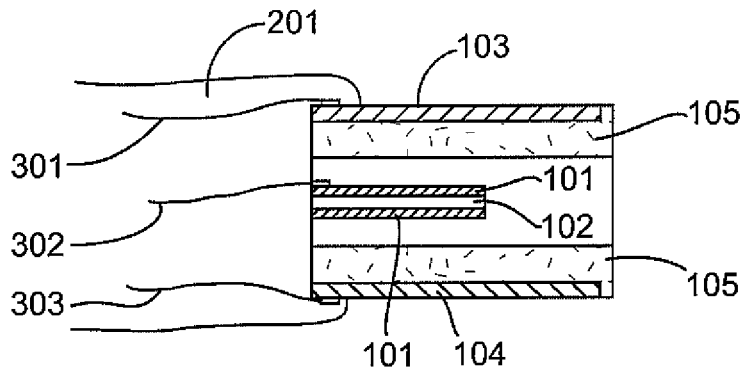
FIG. 3 is a sectional view of the electrical connector of FIG. 1.

Referring now to FIGS. 1-3, an exemplary embodiment of an electrical connector 100 in accordance with the present invention comprises a modified coaxial plug. The electrical connector 100 has an inner metal ring 101 is supported on an inner, insulating cylindrical core 102. An outer metal cover is formed of first and second semi-cylindrical shell-shaped conductors 103, 104 separated from each other by a small gap. The gap between the adjacent longitudinal edges of each semi-cylindrical shell-shaped conductor 103, 104 ensures no physical, and therefore no electrical contact between the conductors 103, 104. The first and second semi-cylindrical shell-shaped conductors 103, 104, respectively, are supported on an outer, hollow, cylindrical insulating former 105 and arranged diametrically opposite one another. The inner core 102 and outer former 105 are coaxial with each other and separated from each other by an air gap 106. The air gap 106 actually is provided so that the electrical connector 100 may mate with or be plugged into a socket of an electronic device such as a laptop computer so that power may be transmitted to the electronic device, as will be further discussed below. The inner metal ring 101 is electrically isolated from the first and second conductors 103, 104 by the insulating former 105 and the air gap 106.

FIG. 2 shows an insulating, moulded cover 201 that seals one end of the electrical connector 100. FIG. 3 shows wired connections 301, 302 and 303 that are made to the first semi-cylindrical shell shaped conductor 103, the inner metal ring 101 and the second semi-cylindrical shell shaped conductor 104, respectively. Note that although the metal ring 101 and the inner core 102 are shown as not extending as far as the former 105 and conductors 103, 104, it should be understood that the metal ring 101 and inner core 102 could extend outwardly as far as these other elements.

The inner metal ring 102, and the first and second conductors 103, 104 may be formed of an electrically conductive metal such as copper or aluminium. The inner core 102 and the outer former 105 are formed of a dielectric insulating material such as foam or plastic, as is known in the art.

Figure 4:
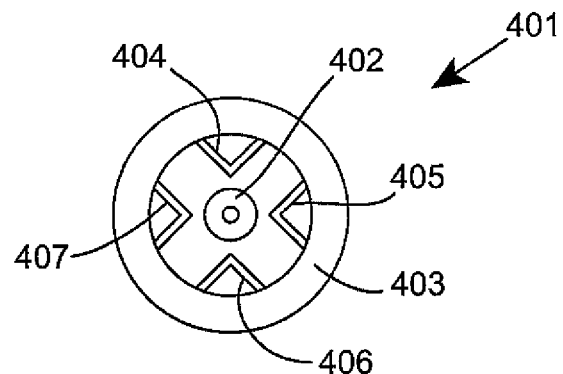
FIG. 4 is an end view of a socket suitable for receiving the electrical connector of FIGS. 1, 2 and 3.
Figure 5:
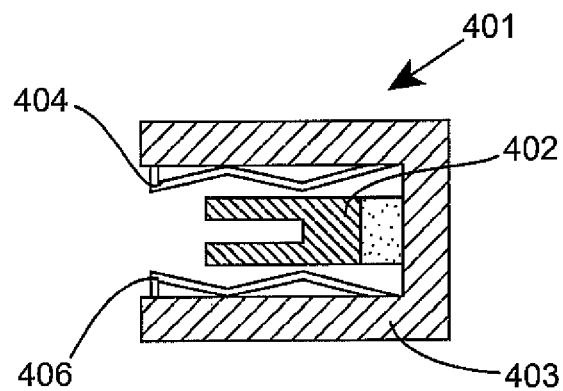
FIG. 5 is a sectional view of the socket of FIG. 4.

With reference now to FIGS. 4 and 5, a socket 401 that is configured to receive the electrical connector 100 of FIGS. 1-3 is shown. The socket 401 has an inner conducting receptacle 402 for receiving the inner metal ring 101 and the insulating core 102 of the connector 100. An outer conducting receptacle 403 is provided for receiving the first and second conductors 103, 104 and the former 105 of the connector 100.

The interior surface of the outer conducting receptacle 403 supports four spring elements 404, 405, 406, 407 that are arranged symmetrically inside the socket 401. The spring elements 404-407 preferably are formed of a conductive metal so that they are in electrical contact with each other and with the outer receptacle 403. Wired connections (not shown) are made to the inner and outer conducting receptacles 402, 403 for transferring received electric current to the device in which the socket 401 is incorporated (e.g., a laptop computer).

In use, when the electrical connector 100 is inserted into the socket 401, and the spring elements 404, 405, 406, 407 inside the socket 401 grip the connector 100 and prevent it from falling out. Additionally at least one of the spring elements 404-407 makes contact with the first semi-cylindrical shell shaped conductor 103 and at least another one of the springs 404-407 makes contact with the second semi-cylindrical shell shaped conductor 104. Therefore, the two semi-cylindrical shell shaped conductors 103, 104 become electrically linked. So, for example, if the first conductor 103 was wired up through the connection 301 to ground potential and the second conductor 104 was left floating or weak pull-up, then upon insertion of the connector 100 into the socket 401, the second conductor 104 would be pulled to ground potential. The above noted functioning of the first and second conductors 103, 104 could be reversed.

An example of the use of electrical connector 100 of FIGS. 1, 2 and 3 in conjunction with an AC-DC power adapter having a power saving mode of operation will now be described with reference to FIG. 6.

Figure 6:
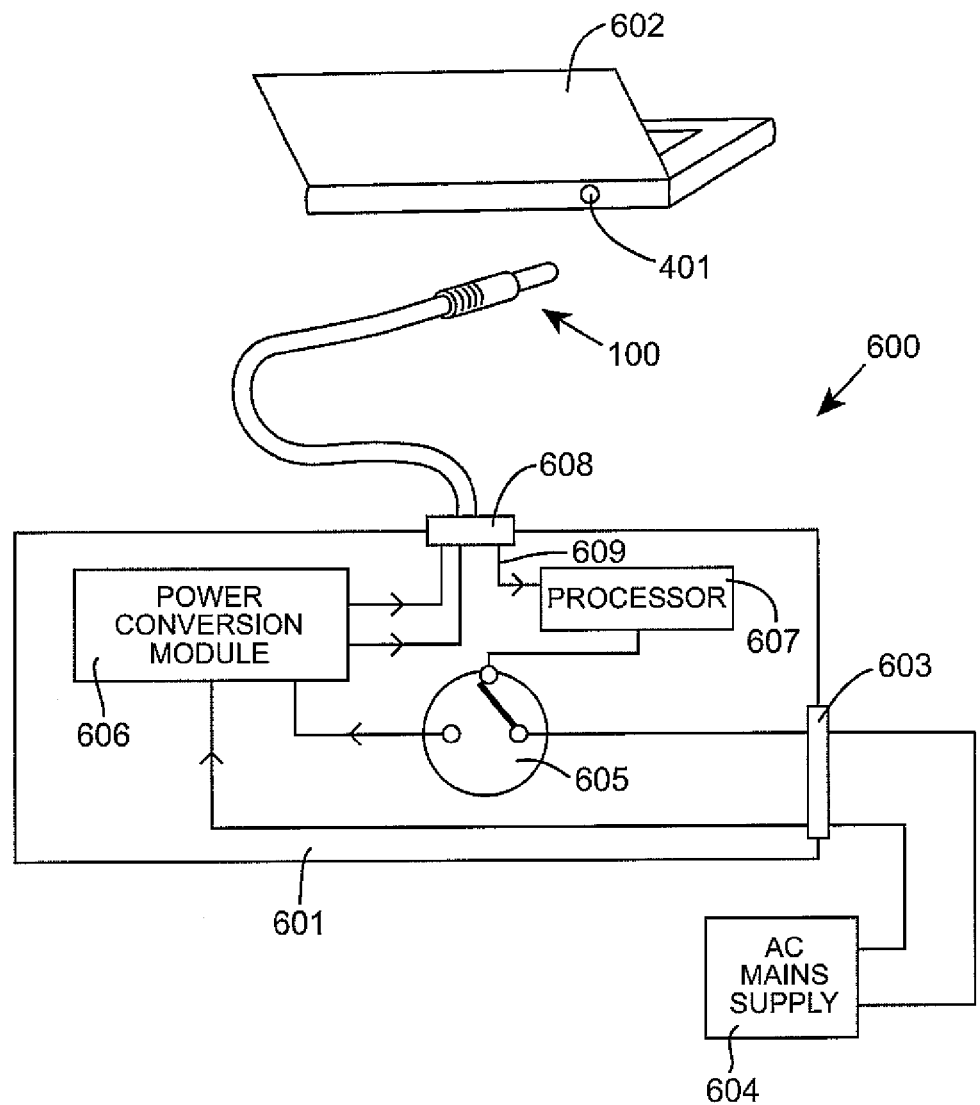
FIG. 6 is a schematic diagram of an electrical system incorporating the electrical connector of FIGS. 1, 2 and 3 and the socket of FIGS. 4-5.

FIG. 6 depicts an exemplary embodiment of an electrical system 600 that includes an AC-DC power adapter 601 for an electronic device such as a laptop computer 602. The laptop computer 602 incorporates a power socket 401 as described with reference to FIGS. 4 and 5, while the power adapter 601 includes an input interface 603 for connecting an input of the adapter 601 to an AC mains supply 604, a switch 605, a power conversion module 606, a processor 607 and output interface 608 that outputs DC power, such as by way of the electrical connector 100 to the laptop computer 602.

The switch 605 is electrically connected in series between the input interface 603 and the power conversion module 606 and operates to prevent or allow current to flow to the power conversion module 606 from the mains supply 604. The processor 607 is configured to open or close the switch 605 depending on certain criteria described below.

When the switch 605 is closed, AC current is supplied to the power conversion module 606 and consequently, DC power appears at the output interface 608. When the switch 605 is open, the power adapter 601 neither supplies any DC output to the output interface 608 nor takes any current from the mains supply 604.

The electrical connector 100, as described with reference to FIGS. 1-3, is connected to the output interface 608 of the adapter 601. The inner ring 101 of the connector 100 is electrically connected to the positive DC voltage output of the adapter 601 by way of the wired connection 302. The first semi-cylindrical shell shaped conductor 103 of the connector 100 is electrically connected to the ground connection of the adapter 601 by way of the wired connection 301, and the second semi-cylindrical shell shaped conductor 104 is electrically connected to an input line 609 of the processor 607 by way of the wired connection wired connection 303.

In this exemplary embodiment, the processor 607 monitors the voltage on the input line 609. When the connector 100 is inserted into the socket 401 of the laptop computer 602, the spring elements 404-407 of the socket 401 electrically connect the first and second conductors 103, 104 of the connector 100, thereby grounding the processor input line 609. The processor 607 detects the potential change on the input line 609 from a floating voltage level to ground and in response, closes the switch 605. The closed state of the switch 605 provides a path for current from the AC mains supply 604 via the input interface 603 to the power conversion module 606 and then DC power is provided to the laptop computer 602 via the electrical connector 100.

When the electrical connector 100 is removed from the socket 401, the processor input line 609 will revert to a floating voltage level. In response to detecting the potential change, the processor 607 opens the switch 605 so that the adapter 601 no longer drains unwanted power from the AC mains supply 604.

The invention has been described with reference to specific examples of embodiments. However, it will be evident to those of skill in the art that various modifications and changes may be made without departing from the broader spirit and scope of the invention as set forth in the appended claims. For example, the connector 100 may take a variety of forms and yet still be compatible with the socket 401 of FIGS. 4 and 5.

Figure 7:
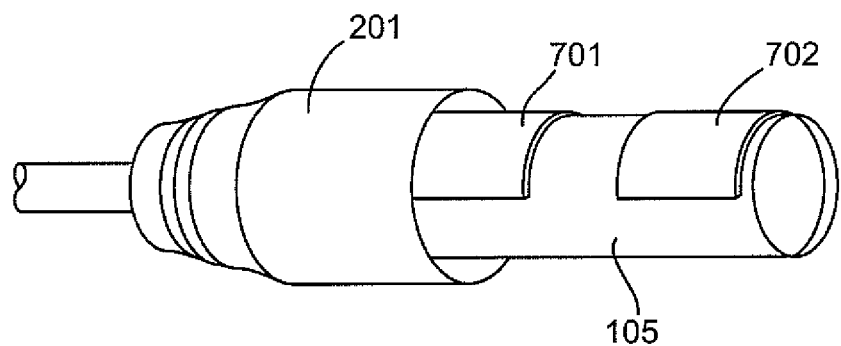
FIGS. 7 and 8 are perspective views of alternative configurations of an electrical connector of the present invention.
Figure 8:
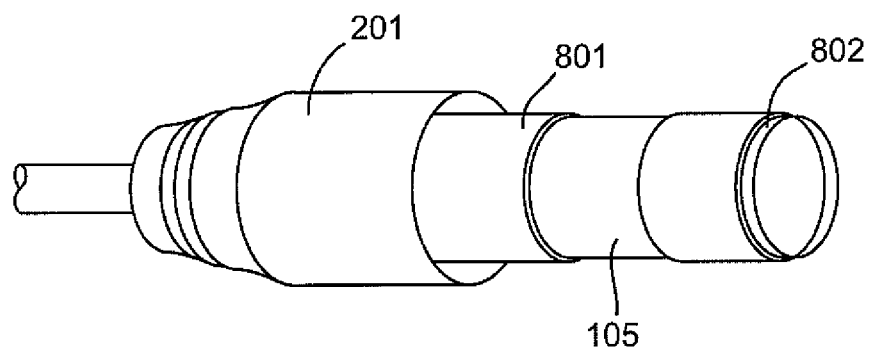

In an alternative embodiment, the electrical connector 100 of FIGS. 1-3 can be arranged as illustrated in FIG. 7. In FIG. 7, the outer conducting arrangement of the connector comprises two semi-cylindrical shell shaped conductors 701, 702 that are arranged on the cylindrical insulating former 105 in an end to end arrangement rather than the opposing arrangement shown in FIGS. 1 and 2. Of course, there is still a gap separating the conductors 701, 702 from each other. In a further alternative configuration shown in FIG. 8, the outer conducting arrangement of the connector may comprise two spaced rings 801, 801 arranged around the cylindrical insulating former 105. Alternatively, the outer conducting arrangement may comprise two rectangular-shaped conductors.

Other modifications, variations and alternatives are also possible and the outer conductors may take a variety of different shapes and configurations relative to one another, depending on he basic shape of the plug. The specifications and drawings are, accordingly, to be regarded in an illustrative rather than in a restrictive sense.

The invention claimed is:

1. An electrical connector assembly, comprising: an electrical connector and a socket wherein the electrical connector includes at least first and second conductors, electrically isolated from one another, and the socket includes at least one conducting element, and wherein the first and second conductors and the at least one conducting element are arranged so that on insertion of the electrical connector into the socket, the at least one conducting element electrically connects the first and second conductors.

2. The electrical connector assembly of claim 1, wherein the electrical connector is a coaxial connector comprising an inner conductor and an outer conductor, the outer conductor comprising the first and second conductors, each in the shape of a semi-cylindrical shell, and arranged to be diametrically opposite one another and separated by a gap, and wherein the socket is provided with one or more spring elements for retaining the electrical connector and configured so that when the electrical connector is inserted into the socket, the spring element makes contact with the first and second conductors and electrically connects them together.

* * * * *